Nov. 17, 1964     F. E. JAMERSON     3,157,581
FUEL ELEMENT AND CORE FOR A NEUTRONIC REACTOR
Filed May 4, 1961     2 Sheets-Sheet 1
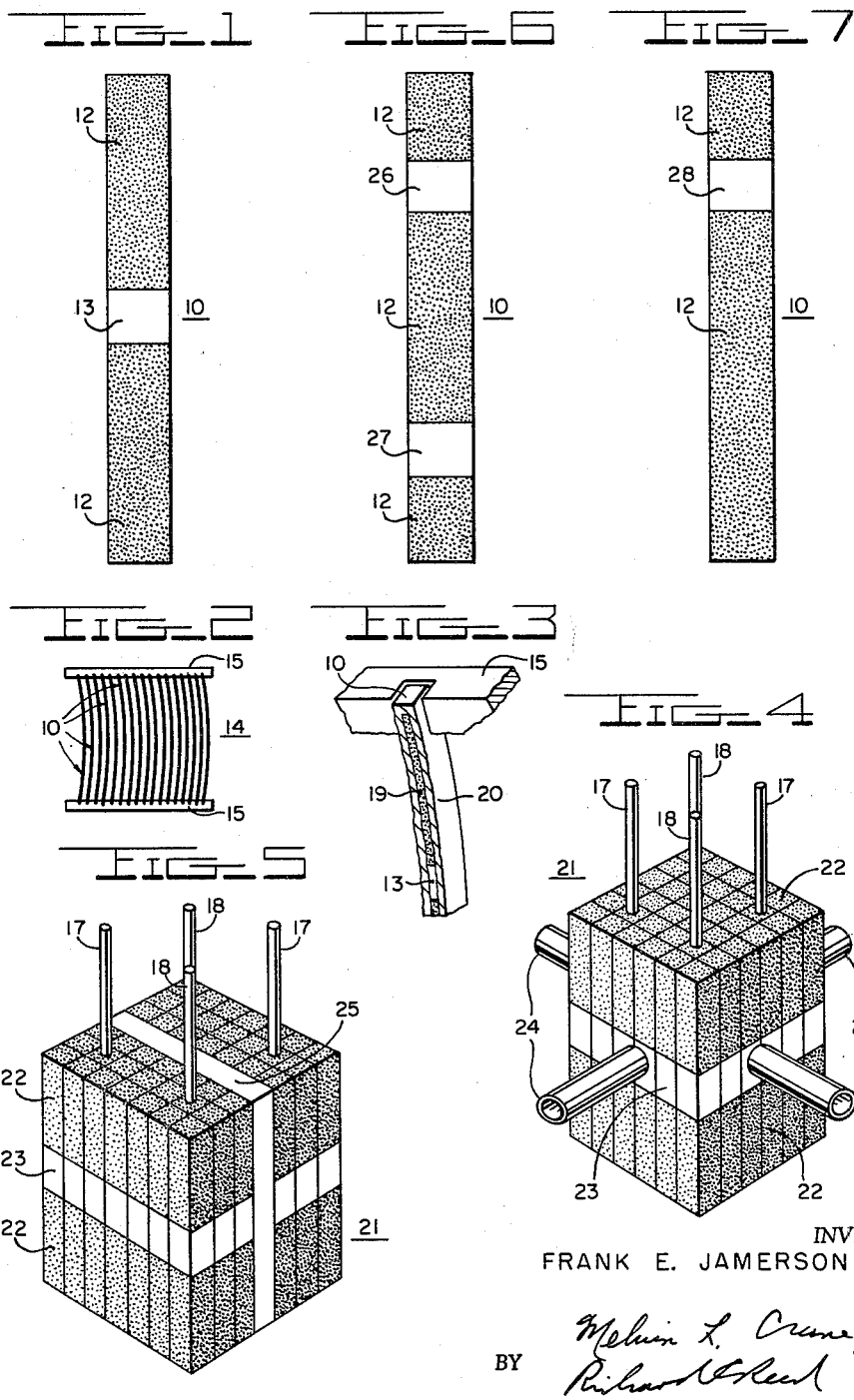
INVENTOR
FRANK E. JAMERSON Nov. 17, 1964    F. E. JAMERSON    3,157,581
FUEL ELEMENT AND CORE FOR A NEUTRONIC REACTOR
Filed May 4, 1961    2 Sheets-Sheet 2
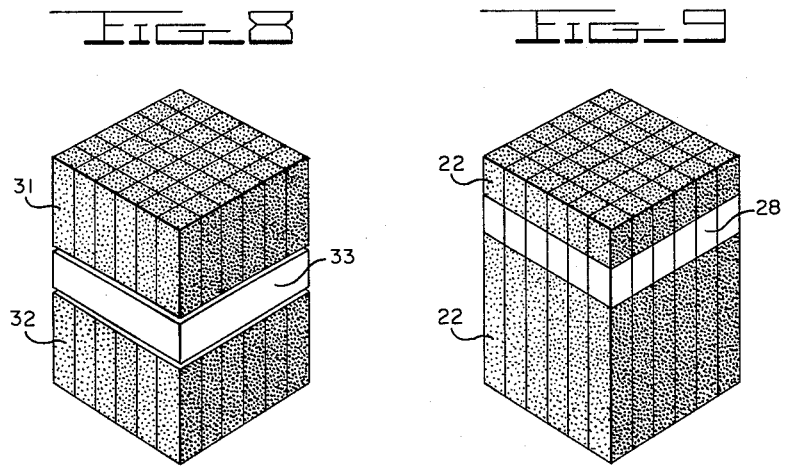
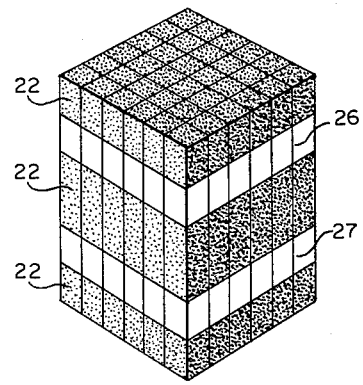
INVENTOR
FRANK E. JAMERSON
BY
ATTORNEY

United States Patent Office 3,157,581
Patented Nov. 17, 1964

3,157,581
FUEL ELEMENT AND CORE FOR A
NEUTRONIC REACTOR
Frank E. Jamerson, 3251 Newgate Road,
Birmingham, Mich.
Filed May 4, 1961, Ser. No. 107,869
15 Claims. (Cl. 176—70)
(Granted under Title 35, U.S. Code (1952), sec. 266)

The invention described herein may be manufactured and used by or for the Government of the United States of America for governmental purposes without the payment of any royalties thereon or therefor.

The present invention is a continuation-in-part of application Serial No. 686,798, filed September 27, 1957, and now abandoned, which relates to neutronic reactors and more particularly to improvements in fuel plate assemblies and cores in research reactors employing enriched uranium fuel and fluid moderator in which the fuel cores are viewed by beam ports.

Heretofore neutronic research reactors have been described and operated with a self-sustaining chain reacting system operating at high neutron densities in which the fission neutrons produced give rise to new fission neutrons in sufficiently large numbers to overcome losses in the system. A chain-reacting system to be successful must be designed in such a way that neutrons are slowed down without much absorption until they reach thermal energies and then mostly enter into uranium rather than into any other element. This slowing down or moderating of the neutron energy, is accomplished by passing the neutrons through a material where the neutrons are slowed down by collision. Such a material is known as a moderator. Several moderators for slowing down neutrons have been used such as graphite, $D_2O$ (heavy water), $H_2O$ (light water), beryllium and various organics. Neutronic reactors employing solid moderator such as graphite are gas cooled by passing gas through channels in the core. The fluid moderated reactors make use of the fluid as a coolant also. The light water moderated and cooled research reactor using highly enriched uranium fuel was designed to provide copious amounts of neutrons in the million electron volt range for radiation damage research to materials employed in high powered reactors. Such a reactor is known as the Materials Testing Reactor (MTR).

It is desirable in certain physics research that beams of slow neutrons in the energy range of 0.001 to 1000 electron volts be used for bombarding materials to study their crystal and magnetic structure; and nuclear parameters. Reactors of the fluid moderator type which have beam ports looking at the fuel of a reactor core are usually used for such research. (A fuel core being an array of fuel assemblies arranged with a specific design for self-sustained operation.) These prior art reactors produce fast mev. neutrons which can be slowed down by materials being placed within the beam ports. These materials not only affect the fast neutrons but also reduce the slow neutron flux of interest. In cases where the beam port is looking at the fuel, fast neutrons enter the port and produces large background for the experiments, sometimes making the test unsuccessful. Such a reactor is described and shown in Report of NRL Progress, January, 1957, pages 1-12.

It is an object of the present invention to provide improved fuel plates for a neutronic reactor for satisfactory operation as a thermal reactor.

Another object is to remove fast neutrons from regions of a reactor core which is viewed for experimental operation.

Yet another object is to provide a reactor core with improved fuel elements for operating beam port type experiments.

Still another object is to provide a neutronic reactor with improved thermal flux.

While still another object is to provide fuel plate elements having a section(s) which contains no fuel.

Another object is to provide fuel plate elements for a reactor core in which slow neutrons can be viewed directly from the core.

Other and more specific objects of this invention will become apparent upon a careful consideration of the following detailed description when taken together with the accompanying drawings, in which:

FIG. 1 illustrates a single fuel plate which has been modified according to the present invention to include a mid-section across the fuel plate which is free of any fuel;

FIG. 2 illustrates a cross section of a fuel assembly made with fuel plates according to the modification of FIG. 1;

FIG. 3 illustrates a portion of an enlarged view of a single fuel plate illustrated by FIG. 1 which illustrates the relative parts of each fuel plate and a side which makes up the fuel assembly of FIG. 2;

FIG. 4 illustrates an improved reactor core formed by a plurality of fuel assemblies such as illustrated by FIG. 2 and made according to the present invention which forms a fuel core split horizontally in the middle by a section free of fuel and with beam ports spaced about the fuel free section;

FIG. 5 illustrates another modification which illustrates a fuel core formed by a plurality of fuel assemblies illustrated by FIG. 2 and with a moderator section positioned vertically through the middle of the core;

FIG. 6 illustrates a fuel element plate having two sections free of fuel;

FIG. 7 illustrates a fuel element plate having a fuel free section which is not at the center portion of the plate;

FIG. 8 illustrates in block form a reactor core made of the fuel plate type assemblies having upper and lower fuel sections separated by a moderator material horizontally across the center of the core;

FIG. 9 illustrates in block form a reactor core formed by a plurality of fuel assemblies illustrated by FIG. 2 and made of fuel assemblies each of which contains a plurality of fuel plates illustrated in FIG. 7; and FIG. 10 illustrates in block form a reactor core formed by a plurality of fuel assemblies illustrated by FIG. 2 and made of fuel assemblies each of which contain a plurality of fuel plates illustrated in FIG. 6.

The present invention is directed to an improvement in the MTR plate type core by incorporating a fuel free section in each fuel plate of the core at a position along the core which is viewed by the beam ports. This split core arrangement provides an area across the entire core in which there is a fuel free section in each fuel plate assembly in addition to the moderating material which slows down the fast neutrons to provide an area which can be viewed by a beam port and mainly slow energy neutrons will enter the beam ports. The wall structure, the moderator and all other structure of the reactor remains the same, only the fuel plates of the assemblies that make up the core is modified according to the teaching of this invention. The fuel plates of the present invention can be used in a core of any of the well known Material Test Reactors, one of which is described and shown in the Report of NRL Progress, pages 1-12, January 1957, published by the U.S. Naval Research Laboratory, Washington, D.C.

Now referring to the drawings wherein like reference characters correspond to like parts throughout, there is shown by illustration in FIG. 1 a fuel plate 10 of a fuel element modified according to the present invention. The fuel plate is provided with uranium-metal alloy sections 12 separated by a mid-section 13 which comprises only the alloying metal without any uranium therein to form a fuel free mid-section or gap 13. In a preferred single fuel plate element, the plate is 0.060 inch thick made like an elongated sandwich in which the elongated center section of the plate is a uranium fuel section 19 including two uranium-metal alloy portions separated linearly by a fuel free portion 13 having a thickness of 0.020 inch which is surrounded by a cladding 20 of the alloying metal having a thickness of 0.020 inch. The alloying metal may consist of a metal from the group consisting of aluminum, zirconium and steel, in which the preferred metal is aluminum. The metal coating on each side seals in the radioactive product elements formed by the splitting of uranium atoms, thereby preventing the uranium from contaminating the fluid moderator and the air. The uranium fuel is enriched to approximately 90 percent uranium 235 and the remainder is uranium 238 which is formed with the alloying metal in amounts according to the desired design of the reactor. The mid-portion 13 of the basic fuel section of the plate contains only the aluminum, zirconium or steel alloying metal which is free of the uranium fuel to provide a fuel plate assembly with a fuel free section separating two sections linearly of fuel. The length of the uranium free gap 13 is determined by a function of the amount of uranium fuel within the uranium-metal alloy portion of the fuel plate. The fuel assembly 14 shown as a cross sectional view in FIG. 2 is formed by a frame having side plates 15 made of the alloying metal from which the fuel plates of the core are made and suitably held together such that slots on the inner surface of the side plates receive the edge of the fuel plates such that the plates are spaced apart with a distance between the plates equal to approximately twice the thickness of the plates.

In order to form a core with sufficient fuel plates 10 to provide a self-sustaining chain reaction core assembly, the fuel plates are positioned into the fuel assemblies 14 and then the fuel assemblies are assembled onto a framework in the usual manner to form the core. A self-sustaining chain reaction system can be made with from seventeen to thirty fuel assemblies arranged side by side in generally a square array, the exact number of assemblies depend on the configuration used, the materials immediately adjacent to the fuel core and the moderator. Each fuel plate assembly in the preferred form comprises eighteen fuel plates 10 of approximately two feet in length by about three inches in width with a uranium free section(s) of about three inches in length and with each fuel plate of the assembly placed 0.117 inch apart within a frame 15 such that the assembly contains a total of 140 grams of uranium 235. Each assembly contains a total of 140 grams of uranium 235. Each assembly is open at the top and bottom to allow water to flow by convection through the assembly between the fuel plates to remove the heat formed during the reaction and to serve as a moderator. Each fuel plate contains a three inch section across the plate which contains no fuel. This coupled with the fact that each fuel plate is only 0.060 inch thick and is cooled by a moderator fluid presents a three inch section across the core which is effectively moderator. Such a fuel core is illustrated in block form by FIG. 4 and is similar to the core structure and in accordance to the arrangement described in the Report of NRL Progress, January 1957, pages 1–12.

The nuclear reaction of the core is controlled in the usual manner by control and safety rods 17 and 18. The rods are positioned within specially designed fuel assemblies in which some of the fuel plates have been removed to receive the desired rods. The control rods 17 are stainless steel and are moved into and out of the fuel core depending on the desired power. The safety rods 18 contain boron, a highly absorbing material for neutrons, and are inserted into other fuel assemblies as a safety measure to provide for rapid quenching of the nuclear reaction, if needed. The safety rods can also be used to make adjustments in the power level of the reactor.

FIG. 4 illustrates a self-sustaining chain reaction core 21 made with fuel assemblies 14 according to the present invention. As shown, the core includes the fuel assemblies 14 with control rods 17 and safety rods 18 inserted into the core. The sections 22 represent uranium-metal alloy fuel sections and the mid-section 23 represents the mid-portion of the fuel plates which contains no uranium fuel. The beam ports 24 are shown looking at the uranium free portion of the core and receive only slow neutrons from the reaction because of the uranium free portion of the core, the moderator which slows down the neutrons by collisions within the uranium free portion and the moderator between the core and the beam ports. Thus slow neutrons enter the beam ports rather than fast neutrons as in reactors where the beam port looks at fuel. In the modification shown, beam ports 24 could encircle the core for multiple experiments.

FIG. 5 is a modification of the arrangement of the fuel assemblies in which a moderator for dividing the fuel core into two sections is positioned vertically. The moderator material 25 in the form of graphite, $D_2O$ (heavy water), $H_2O$ (light water), beryllium or beryllium-oxide can be positioned within the mid-section to replace vertically positioned fuel assemblies normally positioned in the central portion of the core. In this modification there is illustrated a reactor core which uses fuel assemblies such as shown in FIG. 2 wherein the fuel plates that form the fuel assemblies have an area at the mid-portion of the plate which contains no fuel with an area across the core which includes a vertical moderator which replaces fuel assemblies to provide a vertically and horizontally split core. Such a core could be assembled with fuel assemblies of solid fuel plates with only the vertically positioned moderator separating the fuel elements for the same effective operation. With a core such as illustrated in FIG. 5, beam ports could be assembled about each of the areas 23 and 25 of the core that has no fuel.

The features of the present invention in providing a fuel free portion at the mid-section of the fuel plates can be extended to providing fuel plates with two fuel free sections 26 and 27 as shown by FIG. 6 or by making the fuel plates with the fuel free portion 28 off the mid-section of the plate as shown in FIG. 7 and then positioning the fuel assemblies in a split-level fashion such as shown by FIGS. 9 and 10. In either of the modifications shown by FIGS. 9 and 10, the beam ports can be positioned on different levels to obtain the low energy neutrons as desired for a greater number of beam ports.

In FIG. 8 there is illustrated in block form a fuel core constructed with an upper fuel section 31 of short uranium-aluminum alloy plates and a like bottom fuel section 32 with a horizontally positioned moderator 33 between the two sections which effectively splits the fuel core. Such a moderator can be in the form of water (heavy or light), graphite, beryllium or beryllium-oxide. In the preferred form in this modification the water moderator is most satisfactory because it does not require an additional system for cooling. With a moderator of water, the water would travel upwardly along the fuel plates by convection as described for the modification of FIG. 4. In this modification when a solid moderating material is used a special system must be used to force the water through the fuel assemblies to obtain the desired cooling.

It has been determined that split core reactors as described above would not be self-sustaining by using only one of the half-sections since there would be insufficient amounts of uranium. It has also been determined that splitting the core does not affect the power output but provides means for making use of slow neutrons while reducing substantially fast neutron background.

The cores modified according to the present invention will operate in the same manner as the usual fluid moderated type reactor, only the experimental use of such cores can be extended to more materials and for more satisfactory results. With cores as modified above, the materials normally used within the beam ports for slowing down the fast neutrons is no longer needed because slow neutrons are obtained directly from the reactor core by viewing the areas through the core that do not include uranium fuel. However the modified cores can also be used for fast neutrons by placing a test material near the fuel section of the core or by positioning the beam ports such that they look at fuel sections rather than at the sections of the core which contains no fuel.

Obviously many modifications and variations of the present invention are possible in the light of the above teachings. It is therefore to be understood that within the scope of the appended claims the invention may be practiced otherwise than as specifically described.

What is claimed is:

1. An elongated, relatively narrow in width fuel plate for a fuel assembly of a self-sustaining neutronic reactor core in which said fuel plate comprises at least two linearly extending homogeneous fuel containing portions extending through the width of said fuel plate, and a fuel free portion through said plate extending through the width thereof between and continuous with said fuel containing portions in axial alignment therewith along the linear axis wherein the total length of said fuel containing and fuel free portions extend substantially the entire length of said elongated fuel plate.

2. An elongated, relatively narrow in width fuel plate for a fuel assembly of a self-sustaining neutronic reactor core in which said fuel plate comprises at least two linearly extending homogeneous fuel containing portions of uranium-metal alloy extending through the width of said fuel plate in which the alloying metal is from a group of metals comprising aluminum, zirconium, and steel, and a fuel free portion through said fuel plate extending through the width thereof between and continuous with said fuel containing portions in axial alignment therewith along the line or axis wherein the combined total length of said fuel containing and fuel free portions extend substantially the entire length of said elongated fuel plate.

3. An elongated, relatively narrow in width fuel plate for a fuel assembly of a self-sustaining neutronic reactor core in which said fuel plate comprises at least two linearly extending homogeneous fuel containing portions of uranium-aluminum alloy extending through the width of said fuel plate, and a fuel free portion of aluminum through said plate extending through the width thereof between and continuous with said fuel containing portions in axial alignment therewith along the linear axis wherein the combined total length of said fuel containing and fuel free portions extend substantially the entire length of said elongated fuel plate.

4. An elongated, relatively narrow in width fuel plate for a fuel assembly of a self-sustaining neutronic reactor core as claimed in claim 3 wherein said fuel containing portions are of uranium-zirconium alloy and said fuel free section is of zirconium.

5. An elongated, relatively narrow in width fuel plate for a fuel assembly of a self-sustaining neutronic reactor core as claimed in claim 3 wherein said fuel containing portions are of uranium-steel alloy and the fuel free section is of steel.

6. An elongated, relatively narrow in width fuel plate for a fuel assembly of a self-sustaining neutronic reactor in which said fuel plate comprises two linearly extending homogeneous fuel containing portions extending through the width of said fuel plate and a fuel free portion through said plate extending through the width thereof between and continuous with said fuel containing portions in axial alignment therewith along the linear axis wherein the total length of said fuel containing and fuel free portions extend substantially the entire length of said elongated fuel plate.

7. An elongated, relatively narrow in width fuel plate for a fuel assembly of a self-sustaining neutronic reactor as claimed in claim 6 wherein said fuel free portion through said plate is through only the mid-section of said fuel plate and said fuel containing portions are of equal lengths.

8. An elongated, relatively narrow in width fuel plate for a fuel assembly of a self-sustaining neutronic reactor as claimed in claim 6 wherein said fuel free portion is off the mid-section of said fuel plate and one of said fuel containing portions is longer than the other of said two fuel containing portions.

9. An elongated, relatively narrow in width fuel plate for a fuel assembly of a self-sustaining neutronic reactor in which said fuel plate comprises three linearly extending homogeneous fuel containing portions of equal length and extending through the width of said fuel plate and a fuel free portion through said plate extending through the width thereof between and continuous with each of said fuel containing portions in axial alignment therewith along the linear axis wherein the combined total length of said fuel containing and fuel free portions extend substantially the entire length of said elongated fuel plate.

10. An elongated, relatively narrow in width fuel plate for a fuel assembly of a self-sustaining neutronic reactor in which said fuel plate comprises an elongated fuel section enclosed within a metal cladding, said fuel section comprising linearly extending homogeneous fuel containing portions extending through the width of said fuel section and a fuel free portion through said fuel section extending through the width thereof between and continuous with said fuel portions of said fuel section in axial alignment therewith along the linear axis wherein the combined total length of said fuel portions and said fuel free portions extend the total length of said fuel section.

11. An elongated, relatively narrow in width fuel plate for a fuel assembly of a self-sustaining neutronic reactor in which said fuel plate comprises a unitary elongated fuel section enclosed within a metal cladding, said fuel section comprising two linearly extending homogeneous fuel containing portions of uranium-metal alloy extending through the width of said fuel section and a fuel free portion through said fuel section extending through said fuel section between and continuous with said fuel containing portions in axial alignment therewith along the linear axis wherein the combined total length of uranium-metal alloy portions and said fuel free portion extends the full length of said elongated fuel section and said metal cladding is made of the alloying metal of said uranium-metal alloy.

12. An elongated, relatively narrow in width fuel plate for a fuel assembly of a self-sustaining neutronic reactor as claimed in claim 11 wherein the alloying metal of said uranium-alloy metal is from a group of metals comprising aluminum, zirconium, and steel.

13. An elongated, relatively narrow in width fuel plate for a fuel assembly of a self-sustaining neutronic reactor in which said elongated fuel plate comprises a unitary elongated linear fuel section substantially the full length of said fuel plate and enclosed within a metal cladding, said fuel section comprising linearly extending homogeneous fuel containing portions of uranium-aluminum alloy extending through the width of said fuel section and a fuel free portion of aluminum through said fuel section extending through the width thereof between and continuous with said fuel containing portions in axial alignment therewith along the linear axis and said uranium-aluminum alloy fuel portions and said fuel free aluminum portion being enclosed in an aluminum cladding.

14. An elongated, relatively narrow in width fuel plate for a fuel assembly of a self-sustaining neutronic reactor in which said elongated fuel plate comprises a unitary elongated linear fuel section extending substantially the full length of said fuel plate and enclosed within a metal cladding, said fuel section comprising linearly extending homogeneous fuel containing portions of uranium-aluminum alloy extending through the width of said fuel section and a fuel free portion of aluminum through said fuel section extending through the width thereof between and continuous with said fuel containing portions in axial alignment therewith along the linear axis, said fuel section having a thickness of about 0.020 inch with said fuel free section having a length of about three inches, and an aluminum coating with a thickness of about 0.020 inch on all sides of said fuel section, said fuel plate having an overall length of about two feet and a width of about three inches.

15. A self-sustaining neutronic reactor core which comprises a plurality of fluid cooled fuel plate assemblies arranged in such an array as to be self-sustaining, each of said fluid cooled fuel plate assemblies comprising a plurality of elongated fluid cooled fuel plates, each of said plates comprising two linearly extending homogeneous fuel containing portions extending through the width of the fuel plates and a fuel free portion through said fuel plate extending through the width of said fuel plate between and continuous with said fuel containing portions in axial alignment therewith along the linear axis wherein the total combined length of said fuel containing and fuel free portions extend substantially the entire length of said fuel plate, said fuel plates being arranged within said plate assemblies such that said plate assemblies present a self-sustaining core with one section entirely through said core that is free of fuel and separating two fuel containing sections.

References Cited in the file of this patent

UNITED STATES PATENTS

| | | |
|---|---|---|
| 2,831,806 | Wigner | Apr. 22, 1958 |
| 2,838,452 | West et al. | June 10, 1958 |
| 2,894,893 | Carney | July 14, 1959 |
| 2,982,709 | Miles | May 2, 1961 |
| 3,015,616 | Sturtz et al. | Jan. 2, 1962 |

OTHER REFERENCES

1st Geneva Conference on Atomic Energy, August 1955, pp. 191, 192, 198, 199 and 200, vol. 9.

AEC Document TID–5275, October 1955, pp. 152, 180, 183, 184, 263–266.

AEC Document, M–3753, declassified May 9, 1956, page 10.

AEC Document, WAPD–MRP–67, February 24–April 23, 1957, pp. 42 and 43.